(12) United States Patent
Wengrovitz

(10) Patent No.: US 9,756,292 B2
(45) Date of Patent: Sep. 5, 2017

(54) SYSTEM AND METHOD FOR DISTRIBUTING DIGITAL VIDEO STREAMS FROM REMOTE VIDEO SURVEILLANCE CAMERAS TO DISPLAY DEVICES

(75) Inventor: Michael S. Wengrovitz, Concord, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 347 days.

(21) Appl. No.: 12/896,656

(22) Filed: Oct. 1, 2010

(65) Prior Publication Data

US 2011/0242317 A1    Oct. 6, 2011

Related U.S. Application Data

(60) Provisional application No. 61/320,836, filed on Apr. 5, 2010.

(51) Int. Cl.
*H04N 7/18* (2006.01)
*H04N 21/2187* (2011.01)
*H04N 21/262* (2011.01)

(52) U.S. Cl.
CPC ......... *H04N 7/181* (2013.01); *H04N 21/2187* (2013.01); *H04N 21/26258* (2013.01)

(58) Field of Classification Search
CPC ............... H04N 7/181; H04N 21/2187; H04N 21/26258
USPC ......................................................... 348/143
See application file for complete search history.

(56) References Cited

U.S. PATENT DOCUMENTS

| | | | |
|---|---|---|---|
| 6,160,544 A * | 12/2000 | Hayashi et al. | 715/716 |
| 7,979,692 B1 * | 7/2011 | Washington et al. | 713/153 |
| 2003/0041326 A1 * | 2/2003 | Novak et al. | 725/25 |
| 2003/0095042 A1 * | 5/2003 | Ebata et al. | 340/506 |
| 2003/0112929 A1 * | 6/2003 | Chuang | 379/88.13 |
| 2004/0008253 A1 * | 1/2004 | Monroe | 348/143 |
| 2006/0088092 A1 * | 4/2006 | Chen et al. | 375/240.01 |
| 2007/0199076 A1 * | 8/2007 | Rensin et al. | 726/27 |
| 2010/0088735 A1 * | 4/2010 | Sadja | H04N 21/4307 725/109 |

* cited by examiner

*Primary Examiner* — Allen Wong
(74) *Attorney, Agent, or Firm* — Loza & Loza, LLP

(57) ABSTRACT

A video distribution server distributes digital video streams captured by remote video surveillance cameras to appropriate display devices for rendering thereon. The video distribution server selects one or more display devices to receive each digital video stream and instructs the selected display devices to establish respective media sessions with the appropriate remote surveillance cameras to enable the digital video streams to be streamed to the selected display devices via respective point-to-point connections.

16 Claims, 6 Drawing Sheets

SYSTEM AND METHOD FOR DISTRIBUTING DIGITAL VIDEO STREAMS FROM REMOTE VIDEO SURVEILLANCE CAMERAS TO DISPLAY DEVICES

CROSS-REFERENCE TO RELATED APPLICATIONS

The present U.S. Utility Patent Application claims priority pursuant to 35 U.S.C. §119(e) to the following U.S. Provisional Patent Application, which is hereby incorporated herein by reference in their entirety and made part of the present U.S. Utility Patent Application for all purposes:

1. U.S. Provisional Application Ser. No. 61/320,836, entitled "Method and Apparatus for Performing Smart Surveillance Video Routing," filed Apr. 5, 2010.

BACKGROUND OF THE INVENTION

Technical Field of the Invention

The present invention relates in general to video surveillance systems and in particular, to viewing digital video streams from video surveillance cameras.

Description of Related Art

IP-based video surveillance systems with cameras streaming standard and high-definition video over networks to digital recorders and video management systems are becoming commonplace in the market. Such surveillance systems can found, for example, in airports, on city streets, in transportation facilities, in public shopping malls, in chains of retail establishments, and elsewhere. The flexibility of IP-based video surveillance potentially enhances the protection of assets, property and people.

However, although such cameras and systems are widely prevalent, finding the right and enough agents to actually view all of the real-time video has been a challenge. For example, in an airport or city having many hundreds or thousands of IP-cameras, real-time viewing can be problematic, since a single person or a few people in the airport or city security centers cannot keep up with the viewing load. One possible solution would be to deploy additional agents. Since the video streams flow over an IP network, and not over conventional coaxial video cables, the agents could be local or remote and located anywhere.

However, to-date there has not been a systematic approach for coupling human agents to the viewing of video surveillance camera streams. Existing video surveillance systems are heuristic and ad-hoc, and do not exploit factors such as agent-experience, how long an agent has been logged-in and viewing video, which video-analytic events trigger which agents, how and when agents simultaneously view the same video streams, and many other factors. Agents often miss critical events of interest, and many networked video cameras still remain completely unobserved.

SUMMARY OF THE INVENTION

An apparatus, in one embodiment, distributes digital video streams to appropriate display devices for rendering thereon. The apparatus includes an interface coupled to a packet-switched network to enable communication with the display devices and to enable communication with remote surveillance cameras capturing the digital video streams. The apparatus further includes a processor for selecting a first display device to receive a first digital video stream generated by a first remote surveillance camera and instructing the first display device to establish a media session with the first remote surveillance camera to enable the first display device to receive the first digital video stream via a point-to-point connection between the first remote surveillance camera and the first display device.

In a further embodiment, the processor selects at least one additional display device to receive the first digital video stream and instructs the at least one additional display device to establish respective media sessions directly with the first remote surveillance camera.

In still a further embodiment, the processor instructs the first display device to establish an additional media session with a second remote surveillance camera to enable the first display device to receive a second digital video stream generated by the second remote surveillance camera via an additional point-to-point connection between the second remote surveillance camera and the first display device.

In an exemplary embodiment, the processor uses one or more of a predetermined policy, video analytics of the first digital video stream, agent information regarding users of the display devices and user input provided by at least one of the display devices to select the first display device.

In another embodiment of the invention, a system is provided for distributing digital video streams captured by remote video surveillance cameras. The system includes display devices capable of rendering the digital video streams thereon and a video distribution server. The video distribution server is coupled to a packet-switched network to enable communication with the remote surveillance cameras and the display devices. The video server selects a first display device to receive a first digital video stream generated by a first remote surveillance camera and instructs the first display device to establish a media session with the first remote surveillance camera. The first display device receives the first digital video stream via a point-to-point connection between the first remote surveillance camera and the first display device.

In yet another embodiment, a method enables distribution of digital video streams captured by remote surveillance cameras to display devices for rendering thereon. The method includes selecting a first display device to receive a first digital video stream generated by a first remote surveillance camera, instructing the first display device to establish a media session with the first remote surveillance camera and enabling the first display device to receive the first digital video stream via a point-to-point connection between the first remote surveillance camera and the first display device.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, systems and methods are provided for distributing surveillance camera streams to agent display devices. Real-time surveillance video streams can be rendered, for example, on one or more agent display devices selected in accordance with various factors. A video distribution server may provide security service for a single site or may be used in a multi-tenant fashion (e.g., for the cameras in multiple airports, multiple transportation facilities, or multiple retail chains).

Figure 1:
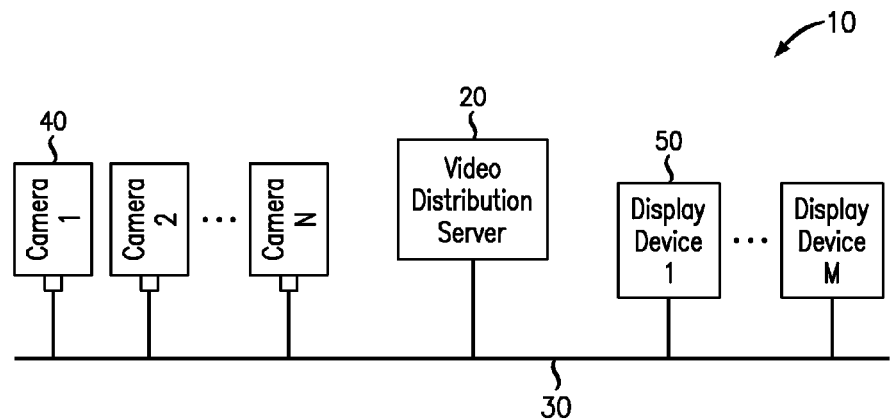
FIG. 1 illustrates an exemplary digital video system for distributing digital video streams captured by remote surveillance cameras to display devices, in accordance with embodiments of the present invention.

FIG. 1 illustrates an exemplary digital video system 10 for distributing digital video streams captured by remote video surveillance cameras 40 to one or more display devices 50 operated by respective agents (users), in accordance with embodiments of the present invention. The system 10 includes the remote video surveillance cameras (camera-1, camera-2 . . . camera-N) 40, the display devices (Display Device 1 . . . Display Device M) 50 and a video distribution server 20. The display devices 50 may be devices having a single display, such as a mobile communication device, a personal computer, a laptop computer or a security system display device, or may include multiple displays, such as a security system video wall. The video distribution server 20 may be, for example, a server within a local network of the display devices 50 and/or cameras 40 or a remote server. The video distribution server 20, cameras 40 and display devices 50 communicate through a packet-switched network, such as an Internet Protocol (IP) network 30 or other type of network.

The video distribution server 20 distributes the digital video streams captured by the remote video surveillance cameras 40 in real-time to one or more of the display devices 50. In particular, the video distribution server 20 communicates with the display devices 50 and causes them to establish connections with the cameras 40. For example, the video distribution server 20 can send messages to one or more display devices 50 instructing those display devices 50 to set-up media sessions with one or more cameras 40. In response to receiving the instructions, the display devices 50 establish signaling connections with designated cameras 40 to enable video media to flow (in one direction) from the cameras 40 directly to the display devices 50. In effect, the video distribution server 20 causes agents (display devices 50) to be routed to cameras 20. Multiple agents (display devices 50) can be viewing the same camera 40, and multiple cameras 40 can be viewed by the same agent (display device 50).

To effectuate the pairing of cameras 40 and display devices 50, the video distribution server 20 maintains a list of active cameras 40 and available display devices 50. For example, when a camera 40 goes on-line, the camera 40 can automatically register with the video distribution server 20 as having a live digital video stream available for viewing/rendering on a display device 50. As another example, an agent can log-on to the video distribution server 20 when the agent is positioned at the display device 50 and ready to view one or more digital video streams.

A particular agent/display device 50 may be able to view only one digital video stream at a time or may be able to view multiple digital video streams simultaneously. The availability of a particular agent/display device 50 depends on the number of digital video streams currently routed to the display device 50 and the maximum number of digital video streams that can be viewed on that display device 50. The maximum number of digital video streams that can be viewed simultaneously on a particular display device 50 can be set by the agent, an administrator or as a default amount by the video distribution server 20.

The availability of an agent/display device 50 may also depend on the particular skill-set that the agent possesses. If the agent is qualified/required to view only particular types of digital video streams and there are no unassigned digital video streams that meet the agent's skill-set, that agent/display device 50 may be taken out of the pool of available agents/display devices 50 for the current set of digital video streams. The type of digital video stream may be determined, for example, based on the originating camera 40 (type of camera, location of camera, etc.) and/or content within the digital video stream (e.g., using video analytics, as described below).

The video distribution server 20 further maintains a table mapping which digital video streams are currently being routed to which display devices 50. Therefore, when an agent logs-off, the video distribution server 20 can determine which digital video streams are affected and identify other available agents/display devices 50 to receive the affected digital video streams, if necessary. Likewise, when a camera 40 turns off or otherwise discontinues streaming, the video distribution server 20 can assign other digital video streams to the agents/display devices 50 that were viewing that camera 40. The video distribution server 20 can be notified when a camera 40 turns off or discontinues streaming via a message from that camera 40, a message from the user/display device 50 (i.e., an automatic message sent by the display device 50 due to an interruption in the video stream or a message sent based on user input) or as a result of a lapse in periodic status messages sent from the camera 40 to the video distribution server 20.

In addition to the availability/skill-set of agents/display devices 50 and status of cameras 40, the video distribution server 20 may also use other information to optimally pair digital video streams with agents/display devices 50. For example, the video distribution server 20 may maintain policy information identifying one or more predetermined policies that control which agents/display devices 50 receive which digital video streams. One policy may route digital video streams to display devices based on the location of the cameras 40 and/or display devices 50. Another policy may route digital video streams to display devices based on display information, such as the resolution and size of the displays on the various display devices 50. Yet another policy may route digital video streams to display devices based on a rotation of streams (i.e., each display device views each stream for 10 minutes).

As another example, the video distribution server 20 may use video analytics to route digital video streams to display devices 50. In one embodiment, the video distribution server 20 is further coupled to the network 30 to receive an identifier of a particular video analytic event detected by the camera 40 and/or an external video analytics system within a particular digital video stream. Such video analytic events can include, for example, motion, a weapon or other item(s) of interest. Based on the event identifier, the video distribution server 20 can identify one or more agents/display devices 50 to which the digital video streams should be routed and can instruct those agents/display devices 50 to immediately establish a media session with those cameras 40.

In another example, the video distribution server 20 may select particular display devices 50 to receive digital video streams from particular cameras 40 based on agent/user input. An agent may need to accept the assignment of a particular digital video stream prior to rendering on the display device 50, and if the agent does not accept the assignment prior to the expiration of a timer within the video distribution server 20, the digital video stream may be assigned to another agent/display device 50. An agent may also be able to override the assignment of a particular video stream to his/her display device 50 and/or request a different agent view that particular video stream instead of or in addition to the agent. It should be understood that there are many other possibilities and variations for how the video distribution server 20 selects display devices 50 for rendering digital video streams from remote video surveillance cameras 40.

Figure 2:
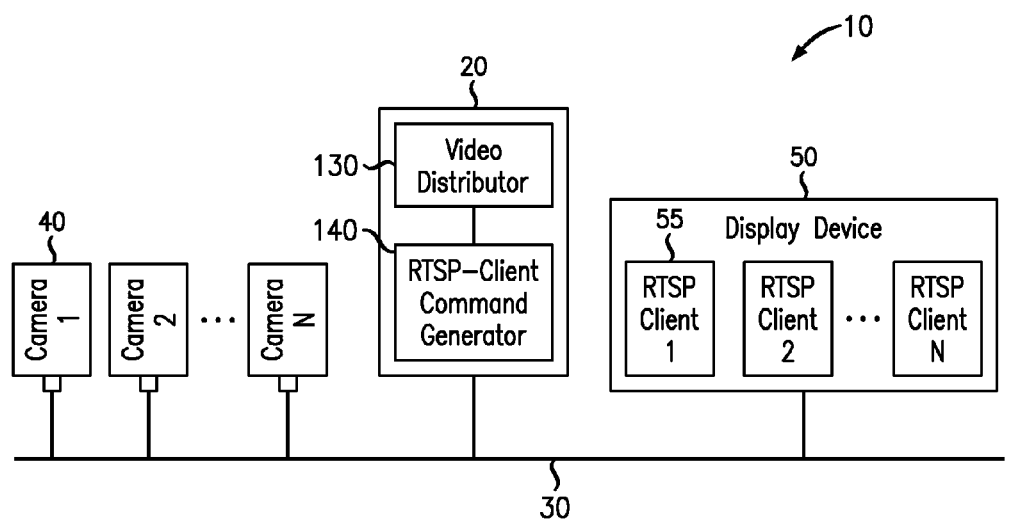
FIG. 2 illustrates an exemplary digital video system for distributing digital video streams captured by remote surveillance cameras to a single display device, in accordance with embodiments of the present invention.

FIG. 2 illustrates an exemplary digital video system 10 for distributing multiple digital video streams to a single display device 50, in accordance with embodiments of the present invention. The display device 50 may be capable of displaying different windows on a single display (i.e., multiple streams can be displayed adjacent one another on the screen) or the display device 50 may include multiple displays, each for displaying a different digital video stream.

One protocol typically used in remote video surveillance cameras 40 is the Real-Time Streaming Protocol (RTSP). RTSP acts as a network-based based remote control protocol. Thus, as shown in FIG. 2, the display device 50 includes a plurality of RTSP clients 55 (RTSP Client 1, RTSP Client 2 . . . RTSP Client N). Each RTSP client 55 uses the RTSP protocol to set-up and establish a real-time media flow, while the flows themselves are typically transmitted with a different IP protocol, such as the Real Time Protocol (RTP).

Thus, the RTSP clients 55 inform the cameras 40 where to send their video media, what compression protocol will be transmitted, etc. Once the media sessions are established, digital video is streamed directly from the cameras 40 to the display device 50, where the digital video is decompressed and rendered on the display device's screen.

Each RTSP Client 55 may establish a separate media session with a particular remote video surveillance camera 40. For example, RTSP Client 1 can establish a media session with Camera 1, RTSP Client 2 can establish a media session with Camera 2 and RTSP Client N can establish a media session with Camera N. Prior to establishing the media sessions, each RTSP client 55 first receives an instruction/command from the video distribution server 20. In particular, the video distribution server 20 utilizes Application Program Interface (API) control interfaces into the RTSP clients 55 to provide instructions thereto, thereby causing the RTSP clients 55 to automatically and optimally establish media sessions with respective cameras 40, according to the rules and scripts in the video distribution server 20.

The API control interfaces into the RTSP clients 55 are implemented via a video distributor module 130 and an RTSP-Client Command Generator module 140 within the video distribution server 20. The video distributor module 130 selects a particular RTSP client 55 within a particular display device 50 to render a digital video stream from a particular camera 40, and the RTSP-Client Command Generator module 140 generates and transmits a command to the particular RTSP client 55, instructing that particular RTSP client 55 to set-up a media session with the particular camera 40. For example, the command issued and transmitted by the RTSP-Client Command Generator module 140 can include an IP address for the particular camera 40.

In an exemplary embodiment, the RTSP-Client Command Generator module 140 transmits a different IP address to the each of the multiple RTSP clients 55 within the display device 50, thereby instructing each RTSP client 55 to connect to a different camera. At a later time, the RTSP-Client Command Generator module 140 may send an entirely different set of IP addresses, thereby causing the display device 50 to render an entirely different set of digital video streams.

The RTSP-Client Command Generator module 140 may also issue commands to disconnect from cameras 40. For example, when the video distribution server 20 detects that a particular camera 40 (e.g., Camera 1) goes off-line, the RTSP-Client Command Generator module 140 can generate and transmit an instruction to the RTSP Client 55 currently viewing Camera 1 to disconnect from that camera 40. As another example, when the video distributor module 130 determines that a particular RTSP Client 55 (e.g., RTSP Client 1) should disconnect from one camera (e.g., Camera 1) and connect to another camera (e.g., Camera 2), the RTSP-Client Command Generator module 40 can issue a command to RTSP Client 1 to teardown the media session between Camera 1 and RTSP Client 1 and set-up the media session with Camera 2. As yet another example, when the video distributor module 130 determines that the media stream from a particular camera (e.g., Camera 1) that is currently being routed to a particular RTSP client (e.g., RTSP Client 1) should instead be routed to a different display device, the RTSP-Client Command Generator module 140 can issue a command to RTSP Client 1 to teardown the media session with Camera 1.

In an exemplary embodiment, when the RTSP-Client Command Generator module 140 sends commands to the RTSP clients 55 within a display device 55, the corresponding display windows open and close automatically, so as to display the selected cameras. However, in another embodiment, the agent associated with the display device 50 may need to accept these commands before the display windows are changed. In this embodiment, if an agent rejects the request, the video distributor module 130 can cause the RTSP-Client Command Generator module 140 to send a changed set of commands to the display device 50 and/or one or more other display devices. In another embodiment, an agent may be able to manually override the selection of one or more screens designated by the video distribution server 20, and in this embodiment, the video distributor module 130 can also cause the RTSP-Client Command Generator module 140 to send a changed set of commands to the display device 50 and/or one or more other display devices.

Figure 3:
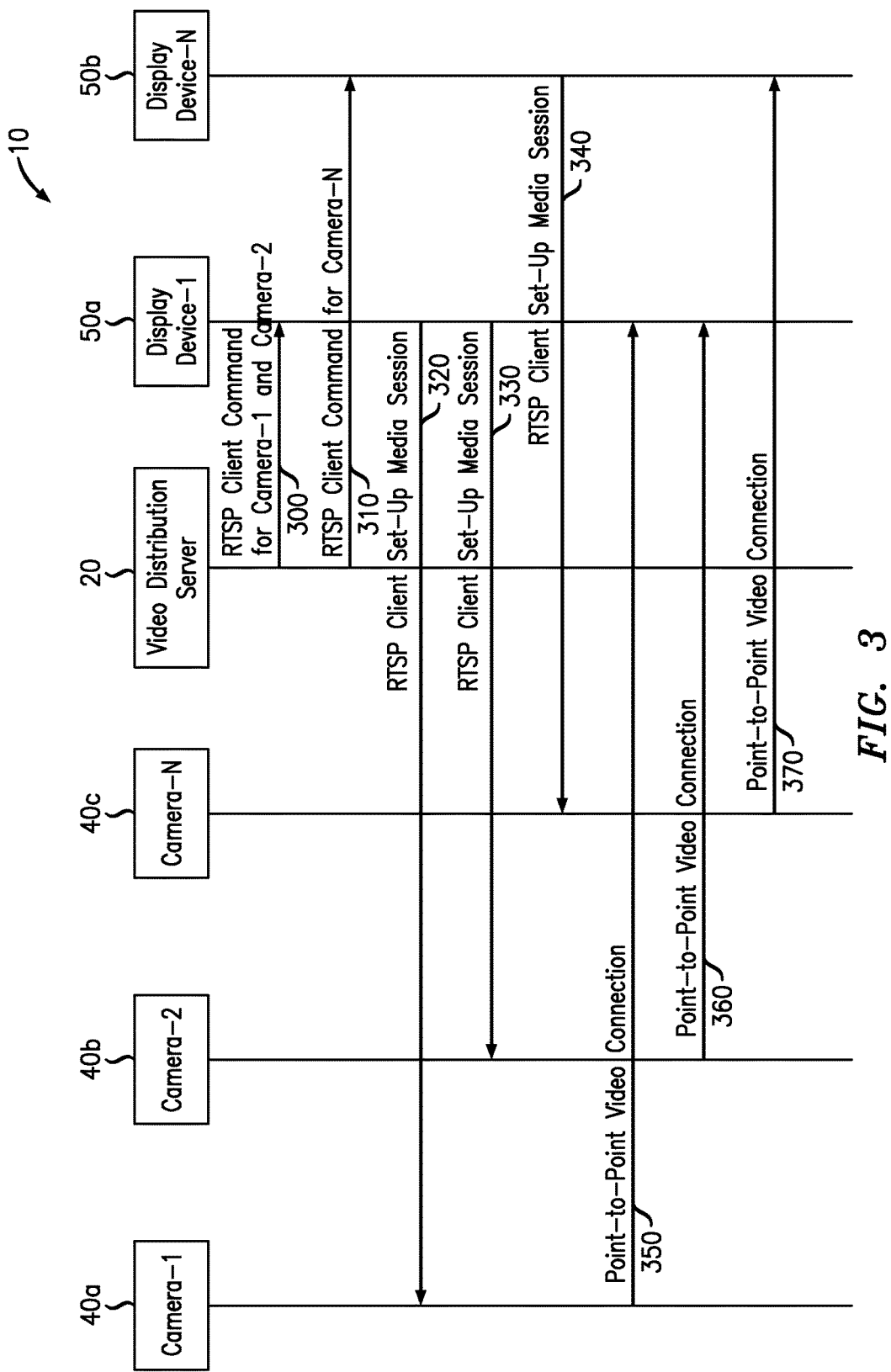
FIG. 3 is a signal flow diagram illustrating exemplary signaling for distributing digital video streams captured by multiple remote surveillance cameras to multiple display devices, in accordance with embodiments of the present invention.

FIG. 3 illustrates exemplary signaling for establishing media sessions to route digital video streams captured by multiple remote surveillance cameras (Camera-1 40*a*, Camera-2 40*b* . . . Camera-N 40*c*) to multiple display devices (Display Device-1 50*a* . . . Display Device-N 50*b*), in accordance with embodiments of the present invention. The video distribution server 20 initially selects an RTSP client within one or more display devices 50*a* and 50*b* to receive each digital video stream captured by the cameras 40*a*-40*c*. In FIG. 3, the video distribution server 20 selected Display Device-1 50*a* to receive the digital video stream from Camera-1 40*a* and Camera-2 40*b* and Display Device-N 50*b* to receive the digital video stream from Camera-N 40*c*.

At step 300, the video distribution server 20 send an RTSP Client Command message to two RTSP clients within Display Device-1 50*a*, instructing the RTSP clients to establish media sessions with Camera-1 40*a* and Camera-2 40*b*. In addition, at step 310, the video distribution server 20 send an RTSP Client Command message to an RTSP client within Display Device-N 50*b*, instructing the RTSP client to establish a media session with Camera-N 40*c*. Thereafter, at steps 320-340, an RTSP client within Display Device-1 50*a* transmits a set-up message to Camera-1 40*a* to establish a signaling connection with Camera-1 40*a*, another RTSP client within Display Device-1 50*a* transmits a set-up message to Camera-2 40*b* to establish the signaling connection with Camera-1 40*b* and an RTSP client within Display Device-N 50*b* transmits a set-up message to Camera-N 40*c* to establish the signaling connection with Camera-N 40*c*. Once the media sessions are established, at steps 350-370, Camera-1 40*a* begins to stream video directly to Display Device-1 50*a* via a point-to-point (one-way) connection, Camera-2 40*b* begins to stream video directly to Display Device-1 50*a* via another point-to-point connection and Camera-N 40*c* begins to stream video directly to Display Device-N 50*b* via a point-to-point connection.

Figure 4:
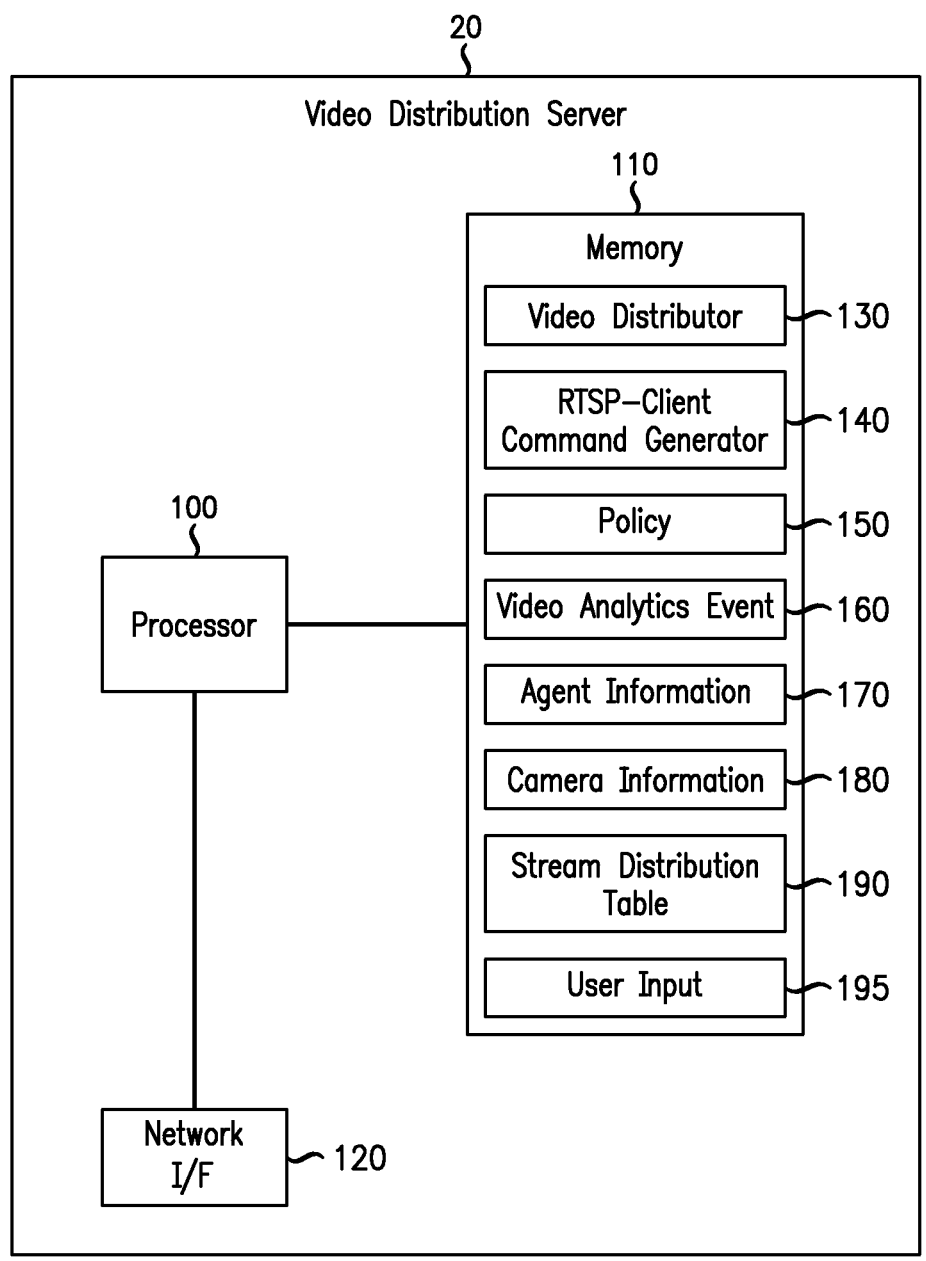
FIG. 4 is a block diagram illustrating an exemplary video distribution server for distributing digital video streams to display devices, in accordance with embodiments of the present invention.

FIG. 4 is a block diagram of an exemplary video distribution server 20, in accordance with embodiments of the present invention. The server 20 includes a processor 100, memory 110 and a network interface (I/F) 120. The network interface 120 is coupled to a packet-switched (IP) or other type of communication network to communicate with remote video surveillance cameras and agent display devices. However, in exemplary embodiments, the network interface 120 does not receive the actual digital video streams from the remote video surveillance cameras.

The memory 110 maintains the video distributor module 130 and the RTSP-Client Command Generator module 140, and the processor 100 is further coupled to the memory 110 to execute instructions of the video distributor module 130 and RTSP-Client Command Generator module 140. For example, the processor 100 can execute instructions of the video distributor module 130 to select one or more display devices to receive a particular digital video stream from a particular camera. The processor 100 can further execute instructions of the RTSP-Client Command Generator module 140 to issue commands to the selected display device(s) to set-up media sessions with the camera.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

The memory 110 further maintains agent information 170 and camera information 180. The camera information 180 includes, for example, an indication of whether each camera is on-line and currently transmitting digital video streams. The camera information 180 may also include camera characteristics, camera location and any other information associated with the camera.

The agent information 170 includes, for example, agent availability and agent skill-sets. Agent availability may indicate whether an agent is logged on to the video distribution server 20 and whether that agent is able to view one or more video streams from remote video surveillance cameras. For example, if an agent is able to view three digital video streams simultaneously on one or more displays of a display device associated with the agent, and the agent is currently only viewing one digital video stream, the agent would be considered available to receive additional digital video streams. The maximum number of streams that an agent can view simultaneously can be set by the agent, by an administrator or based on the capabilities of the display device.

Agent skill-sets may indicate particular types of digital video streams, particular cameras and/or particular events occurring within the digital video streams that an agent is qualified and/or assigned/preferred to view. For example, an agent skill-set may require the video distributor module 130 to select one or more agents (depending on availability) to view one or more digital video streams, depending on the content and/or location of the cameras. As another example, if an agent with a lower skill experience logs in, the video distributor module 130 may select a more senior agent to view a set, or subset, of the cameras that the lower skill agent is currently viewing. Agent skill-sets can also be set by the agent or by an administrator of the video distribution server 20.

In addition to agent availability and agent skill-sets, the agent information 170 may also include any other pertinent information associated with the agent, such as characteristics of the display device that the agent is currently logged into. For example, the agent information 170 may indicate the number of displays associated with the display device that the agent is logged into. As another example, the agent information 170 may indicate the resolution, screen size and location of the agent displays on which the digital video streams can be rendered.

In addition, the memory 110 also maintains policy information 150, which includes various scripts and/or algorithms designed to optimally pair display devices with cameras. Policy information 150 may be programmed by a user or administrator of the system or may be pre-determined based on camera information 180 (e.g., camera characteristics), display device characteristics, agent information 170 (e.g., agent skill-sets, availability, etc.), network characteristics and/or other factors.

Policy information 150 is input to the video distributor module 130 to enable the display device selection for each camera. For example, the policy information 150 may dictate that the video distributor 130 command RTSP clients on each agent's display to establish media sessions with a first set of N cameras for the first 10 minutes and a second set of M cameras for the next 10 minutes in order to rotate the agents through the series of cameras to be viewed. It should be understood that there are many other possibilities and variations for the policy information 150.

In addition to policy information 150, a video analytic event 160 may also be input to the video distributor module 130 to control the selection of agents for cameras. The video analytic event 160 may be input to the video distribution server 20 via the network I/F 120 from the camera itself and/or from an external video analytic system. For example, if the video analytic event 160 indicates a certain motion or object detection (e.g., a weapon or other object), the video detector module 130 may cause the RTSP-Client Command Generator 140 to issue one or more commands to the agent's RTSP clients, thereby causing a change in the cameras being viewed by one more agents.

In addition to policy 150 and video analytic events 160, user graphical user interface (GUI) instructions (user input) 195 may also be provided to the video distributor module 130 to control which streams are rendered on which agent display devices. For example, the user/agent may select a particular digital video stream to view. In another example, an agent may be able to manually override the selection of one or more streams designated by the video distributor module 130.

Furthermore, policy 150, video analytic events 160 and user GUI instructions 195 may also interact with each other and with agent information 170 and camera information 180 in various ways to control the video distributor module 130. As an example, in a scenario when a more-experienced agent is training a less-experienced agent, if the more-experienced agent selected one particular camera for viewing, the policy information 150 may dictate that less-experienced agent's screen automatically follow the camera change. In another example, if the video distribution server 20 receives notification of a video analytic event 160, the video distributor can access policy information 150 and agent information 170 to determine which agent should receive the digital video stream containing the video analytic event 160. It should be understood that there are many other possibilities and variations for policy 150, video analytic events 160, user GUI instructions 195, agent information 170 and camera information 180 to interact with each other, so as to optimally control the agent/display device selection for various camera streams.

Figure 5:
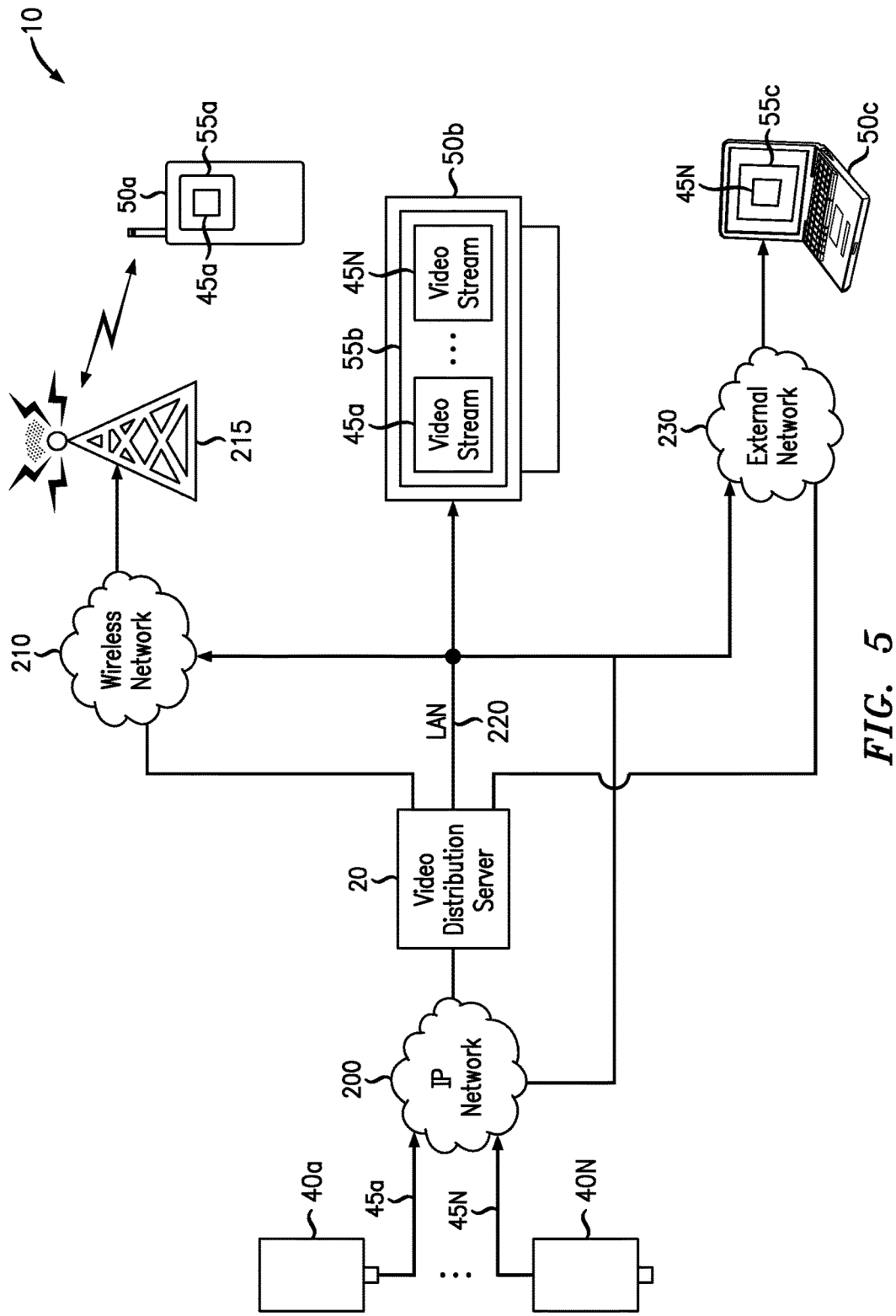
FIG. 5 illustrates an exemplary system for distributing digital video streams to various types of display devices, in accordance with embodiments of the present invention.

FIG. 5 illustrates an exemplary system 10 for distributing digital video streams to various types of display devices, in accordance with embodiments of the present invention. The system 10 includes remote surveillance cameras 40*a* . . . 40N, each coupled to the distribution video server 20 and to a plurality of display devices 50*a*-50*c* via an IP network 200. As shown in FIG. 5, the display devices can include, for example, a mobile communication device 50*a*, a large screen display (or video wall) 50*b* and a computer 50*c*, such as a personal computer or laptop computer, the latter being illustrated.

The mobile communication device 50*a* is coupled to the distribution video server 20 and the IP network 200 via a wireless network 210 and a network access point 215 (e.g., base station or other network transceiving device) providing a wireless connection to the mobile communication device. The mobile communication device 50*a* can be, for example, a smartphone or other mobile device capable of communicating with the network access point 215. The wireless network 210 can be any type of wireless network, including, but not limited to, Global System for Mobile Communications (GSM), Personal Communications Service (PCS), Wi Fi, Code Division Multiple Access (CDMA) or any other 3G or 4G wireless network.

The large screen display 50*b* is coupled to the distribution video server 20 and the IP network 200 via a local area network (LAN) 220. The LAN 220 and IP network 200 may, in some embodiments, be the same network. The computer 50*c* is coupled to the video distribution server 20 and the IP network 200 via an external network 230. The external network 230 can be, for example, a packet-switched network, such as the IP network 200, or a circuit-switched network, or a combination thereof.

The video distribution server 20 maintains camera 40*a* . . . 40N and display device 50*a*-50*c* availability information and optimally pairs one or more available display devices 50*a*-50*c* with each of the available cameras 40*a* . . . 40N, as described above. Thus, the video distribution server 20 communicates with each of the display devices 50*a*-50*c* to cause the display devices 50*a*-50*c* to set-up media sessions directly with one or more cameras 40*a* . . . 40N. Once the media sessions are established, the cameras 40*a* . . . 40N can each transmit their respective digital video streams 45*a* . . . 45N directly towards the designated display devices 50*a*-50*c* (without routing the video traffic through the video distribution server 20).

Each of the display devices 50*a*-50*c* includes a respective display/screen (or displays/screens) 55*a*-55*c* for rendering the digital video streams 45*a* . . . 45N from the cameras 40*a* . . . 40N. In addition, each of the display devices 50*a*-50*c* may be able to render multiple video streams 45*a* . . . 45N simultaneously. As can be seen in FIG. 5, display device 50*a* renders a single digital video stream 45*a* from camera 40*a* on its screen 55*a*, display device 50*b* renders each of the digital video streams 45*a* . . . 45N from each of the cameras 40*a* . . . 40N on its screen 55*b* and display device 50*c* renders a single digital video stream 45N from camera 40N on its screen 55*c*.

Figure 6:
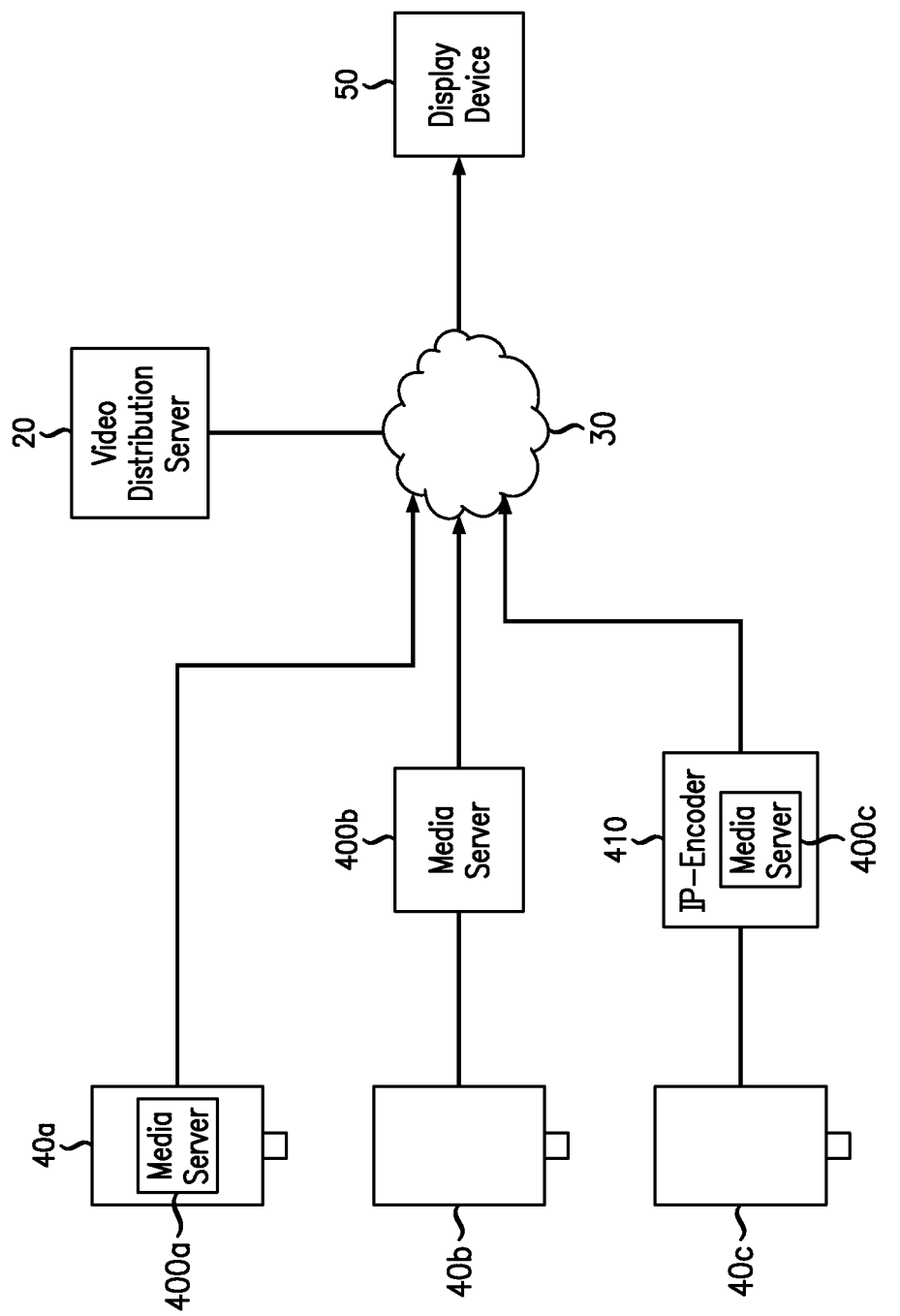
FIG. 6 illustrates an exemplary system for establishing media sessions between a display device and various types of remote video surveillance cameras, in accordance with embodiments of the present invention.

FIG. 6 illustrates an exemplary system for establishing media sessions between a display device 50 and various types of remote video surveillance cameras 40*a*-40*c*, in accordance with embodiments of the present invention. Camera 40*a* includes a built-in media server 400*a* for establishing the media session directly with the display device 50 via network 30, while camera 40*b* is coupled to an external media server 400*b*, which provides the capability to establish the media session with the display device 50. In addition, camera 40*c* is a legacy analog camera, which is IP-enabled via a connection to an IP-encoder 410, which contain a media server 400*c* for establishing the media session with the display device 50. Thus, regardless of the type of camera 40*a*-40*c* utilized, the video distribution server 20 can maintain information regarding the IP address of each media server 400*a*-400*c* associated with the cameras 40*a*-40*c* and provide the IP address of a particular media server (e.g., media server 400*b*) to the display device 50 to enable the display device 50 to establish a media session with that media server 400*b* via network 30 in order to stream video from camera 40*b* to display device 50.

Figure 7:
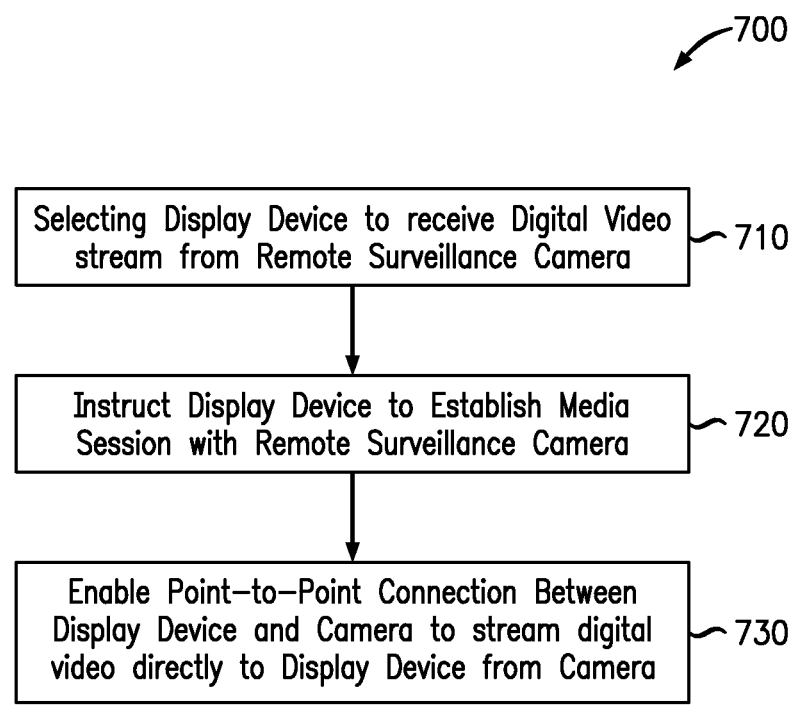
FIG. 7 illustrates an exemplary method for distributing a digital video stream captured by a remote surveillance camera to a selected display device, in accordance with embodiments of the present invention.

FIG. 7 is a flowchart illustrating an exemplary process 700 for distributing a digital video stream captured by a remote surveillance camera to a selected display device, in accordance with embodiments of the present invention. The process begins at block 710, where a display device is selected to receive a digital video stream generated by a remote surveillance camera. Then, at block 720, the display device is instructed to establish a media session with the remote surveillance camera, and at block 730, a point-to-point connection between the display device and the remote surveillance camera is set-up to enable the display device to receive the digital video stream directly from the remote surveillance camera.

As will be recognized by those skilled in the art, the innovative concepts described in the present application can be modified, varied and adapted over a wide range of applications. Accordingly, the scope of patents subject matter is not limited to any of the specific exemplary teachings discussed, but is instead defined by the following claims.

The invention claimed is:

1. An apparatus for distributing digital video streams to display devices for rendering thereon, comprising:
    an interface coupled to a packet-switched network to enable communication with the display devices and to enable communication with remote surveillance cameras capturing respective digital video streams;
    a timer; and
    a processor for:
        determining a status of each of the display devices and each of the remote surveillance cameras to identify available ones of the display devices and streaming ones of the remote surveillance cameras;
        pairing a first display device of the available ones of the display devices with a first remote surveillance camera of the streaming ones of the remote surveillance cameras generating a first digital video stream;
        determining a first display device to receive the first digital video stream based on availability of an agent;
        wherein the processor further initializes the timer upon requesting the agent associated with the first display device to accept receipt of the first digital video stream;
        wherein the processor further instructs the first display device via the interface to establish a media session with the first remote surveillance camera to enable the first display device to receive the first digital video stream via a point-to-point connection between the first remote surveillance camera and the first display device when the agent accepts receipt of the first digital video stream prior to expiration of the timer;
        determining a second display device to receive the first digital video stream based on availability of display devices; and
        wherein the processor further automatically pairs the second display device of the available ones of the display devices to the first digital video stream when the agent does not accept receipt of the first digital video stream prior to expiration of the timer.

2. The apparatus of claim 1, wherein the point-to-point connection provides a one-way media flow of the digital video stream from the first remote surveillance camera to the first display device.

3. The apparatus of claim 1, wherein the processor further selects at least one additional display device to receive the first digital video stream and instructs the at least one additional display device to establish respective media sessions directly with the first remote surveillance camera.

4. The apparatus of claim 1, wherein the processor instructs a Real Time Streaming Protocol (RTSP) client on the first display device to establish the media session.

5. The apparatus of claim 1, wherein the processor further instructs the first display device via the interface to establish an additional media session with a second remote surveillance camera to enable the first display device to receive a second digital video stream generated by the second remote surveillance camera via an additional point-to-point connection between the second remote surveillance camera and the first display device.

6. The apparatus of claim 1, wherein the processor further transmits an Internet Protocol (IP) address of the first remote surveillance camera to the first display device to cause the first display device to establish the media session therewith.

7. The apparatus of claim 1, wherein the interface is further coupled to the packet-switched network to receive a video analytic event associated with the first digital video stream generated by the first remote surveillance camera or an external video analytic system, and the processor uses the video analytic event to select the first display device.

8. The apparatus of claim 1, wherein the processor uses one or more of a predetermined policy, agent information regarding users of the display devices, camera information regarding the remote video surveillance cameras and user input provided by at least one of the display devices to select the first display device.

9. The apparatus of claim 8, wherein the agent information includes at least one of an availability of and a skill-set of each of the users of the display devices.

10. The apparatus of claim 9, wherein the user input includes at least one of a manual override of a previous selection of one of the display devices for the first digital video stream and a manual selection of the first display device for the first digital video stream.

11. The apparatus of claim 1, wherein the processor further identifies the streaming ones of the remote video surveillance cameras and the available ones of the display devices via a registration process performed by the remote video surveillance cameras and the display devices.

12. A system for distributing digital video streams captured by remote video surveillance cameras, comprising:
    display devices capable of rendering the digital video streams thereon; and
    a video distribution server coupled to a packet-switched network to enable communication with the remote surveillance cameras and the display devices, the video distribution server determining a status of each of the display devices and each of the remote surveillance cameras to identify available ones of the display devices and streaming ones of the remote surveillance cameras and pairing a first display device of the available ones of the display devices with a first remote surveillance camera of the streaming ones of the remote surveillance cameras generating a first digital video stream;
    wherein the video distribution server further initializes a timer upon requesting an agent associated with the first display device to accept receipt of the first digital video stream;
    wherein the video distribution server further instructs the first display device to establish a media session with the first remote surveillance camera to enable the first display device to receive the first digital video stream via a point-to-point connection between the first remote surveillance camera and the first display device when the agent accepts receipt of the first digital video stream prior to expiration of the timer;
    determining a second display device to receive the first digital video stream based on availability of display devices; and
    wherein the video distribution server further automatically pairs a second display device of the available ones of the display devices to the first digital video stream when the agent does not accept receipt of the first digital video stream prior to expiration of the timer.

13. The system of claim 12, wherein the point-to-point connection provides a one-way media flow of the digital video stream from the first remote surveillance camera to the first display device.

14. The system of claim 12, wherein the point-to-point connection is between a media server coupled to the first remote surveillance camera and the first display device.

15. The system of claim 12, wherein the first display device includes a Real Time Streaming Protocol (RTSP) client for establishing the media session.

16. The system of claim 12, wherein the display devices include one or more of mobile communication devices, personal computers and laptop computers.

* * * * *